(12) United States Patent
Goodman et al.

(10) Patent No.: US 11,067,711 B2
(45) Date of Patent: Jul. 20, 2021

(54) TIME-REVERSED NONLINEAR ACOUSTIC DOWNHOLE PORE PRESSURE MEASUREMENTS

(71) Applicants: TRIAD NATIONAL SECURITY, LLC, Los Alamos, NM (US); CHEVRON U.S.A. INC., San Ramon, CA (US)

(72) Inventors: Harvey E. Goodman, Houston, TX (US); Timothy James Ulrich, II, Los Alamos, NM (US); Robert A. Guyer, Los Alamos, NM (US); Paul A. Johnson, Santa Fe, NM (US); Marcel C. Remillieux, Los Alamos, NM (US); Pierre-Yves Le Bas, Los Alamos, NM (US)

(73) Assignees: TRIAD NATIONAL SECURITY, LLC, Los Alamos, NM (US); CHEVRON U.S.A. INC., San Ramon, CA (US)

( * ) Notice: Subject to any disclaimer, the term of this patent is extended or adjusted under 35 U.S.C. 154(b) by 123 days.

(21) Appl. No.: 16/343,975

(22) PCT Filed: Mar. 26, 2017

(86) PCT No.: PCT/US2017/024203
§ 371 (c)(1),
(2) Date: Apr. 22, 2019

(87) PCT Pub. No.: WO2018/080583
PCT Pub. Date: May 3, 2018

(65) Prior Publication Data
US 2019/0250295 A1    Aug. 15, 2019

Related U.S. Application Data

(60) Provisional application No. 62/411,717, filed on Oct. 24, 2016.

(51) Int. Cl.
G01V 1/00    (2006.01)
G01V 1/30    (2006.01)
(Continued)

(52) U.S. Cl.
CPC .............. *G01V 1/306* (2013.01); *E21B 47/06* (2013.01); *E21B 47/107* (2020.05); *E21B 49/00* (2013.01);
(Continued)

(58) Field of Classification Search
USPC .......................................................... 367/38
See application file for complete search history.

(56) References Cited

U.S. PATENT DOCUMENTS 5,343,440 A * 8/1994 Kan ...................... E21B 47/06
367/27
7,310,580 B2 * 12/2007 Zhou ...................... G01V 1/50
702/6
(Continued)

FOREIGN PATENT DOCUMENTS

CA    2811426    4/2012
EP    2622379    8/2013
(Continued)

OTHER PUBLICATIONS

G. Renaud et al: "Hysteretic nonlinear evealed by dynamic acousto-elastic testing : Low Strain Hysteretic Anelasticity", The 3rd EAA European Congress on Acoustics (Forum Acusticum 2002), vol. 40, No. 4, Feb. 28, 2013 (Feb. 28, 2013), pp. 715-719, XP055700499, Sevilla, Spain ISSN: 0094-8276, DOI: 18.1082/gr1.50150 * A long-term goal is to dentify the physical mechanisms responsible for the observed elastic nonlinear behaviors of Earth materials and to evaluate the influence of external static pressure and a saturating fluid. Another goal is to refine the data processing technique for in situ applications. Earth tides.; paragraph [0817] (5 pages).
(Continued)

*Primary Examiner* — James R Hulka
(74) *Attorney, Agent, or Firm* — Esplin & Associates, PC

(57) ABSTRACT

Apparatus (10) and methods for measurement of pore pressure in rock formations through a metal borehole casing (32)
(Continued)

after a well is cased and cemented, are described. Such measurements may be accomplished by using the Dynamic Acoustic Elasticity (DAE) method for characterizing nonlinear parameters by perturbing a selected rock formation region with a High Amplitude, Low Frequency (HALF) acoustic strain wave, and probing this region using a Low Amplitude, High Frequency (LAHF) acoustic wave (18), (22). Time reversal techniques (36) may be employed for focusing acoustic energy into the formation in the vicinity of the pipe or open hole. The change in wave speed of the probe pulses as the HALF induced strain wave oscillation propagates through the formation, as a function of the induced strain, may be used to determine the nonlinear elastic parameters $\alpha$, $\beta$, $\delta$, and A of the pore pressure, from which the pore pressure may be determined in the region of the HALF wave.

12 Claims, 7 Drawing Sheets

(51) Int. Cl.
| | |
|---|---|
| *E21B 47/06* | (2012.01) |
| *G01N 29/024* | (2006.01) |
| *G01N 15/08* | (2006.01) |
| *G01H 5/00* | (2006.01) |
| *G01N 29/34* | (2006.01) |
| *E21B 47/107* | (2012.01) |
| *E21B 49/00* | (2006.01) |
| *E21B 21/00* | (2006.01) |

(52) U.S. Cl.
CPC ............ *G01H 5/00* (2013.01); *G01N 15/082* (2013.01); *G01N 29/024* (2013.01); *G01N 29/348* (2013.01); *E21B 21/00* (2013.01); *G01N 2291/02441* (2013.01); *G01N 2291/02827* (2013.01); *G01V 2210/6242* (2013.01); *G01V 2210/6248* (2013.01)

(56) References Cited

U.S. PATENT DOCUMENTS

| | | | |
|---|---|---|---|
| 8,321,133 B2 | 11/2012 | Hsu | |
| 8,522,611 B2* | 9/2013 | Frumin | G01V 1/50 73/152.16 |
| 8,576,661 B2* | 11/2013 | Johnson | G01V 1/46 367/35 |
| 8,995,224 B2* | 3/2015 | Esmersoy | G01V 1/42 367/27 |
| 9,103,928 B2 | 8/2015 | Gao | |
| 9,822,634 B2* | 11/2017 | Gao | E21B 47/16 |
| 10,260,300 B2* | 4/2019 | Dorovsky | G01N 33/24 |
| 2002/0159332 A1 | 10/2002 | Thomann | |
| 2004/0184348 A1* | 9/2004 | Shook | G01V 1/306 367/57 |
| 2005/0041526 A1 | 2/2005 | Esmersoy | |
| 2009/0105957 A1* | 4/2009 | Hsu | G01N 29/024 702/12 |
| 2011/0141847 A1 | 6/2011 | Frumin | |
| 2012/0075951 A1 | 3/2012 | Johnson | |
| 2014/0111209 A1* | 4/2014 | Gao | G01V 3/26 324/332 |
| 2015/0015413 A1 | 1/2015 | Gao | |
| 2016/0299050 A1 | 10/2016 | Dorovsky | |

FOREIGN PATENT DOCUMENTS

| | | |
|---|---|---|
| EP | 3077615 | 10/2016 |
| EP | 3529641 | 8/2019 |
| GB | 2405205 | 2/2005 |

OTHER PUBLICATIONS

J. Riviere et al: "Pump and probe waves in dynamic acousto-elasticity: Comprehensive description and comparison with nonlinear elastic theories", Journal of Applied Physics, vol. 114, No. 5, Aug. 7, 2813 (2813-88-87), p. 854985, P855788787, US ISSN: 8821-8979, DOI: 18.1863/1.4816395 * the whole document * (20 pages).

* cited by examiner

TIME-REVERSED NONLINEAR ACOUSTIC DOWNHOLE PORE PRESSURE MEASUREMENTS

CROSS-REFERENCE TO RELATED APPLICATIONS

The present application is a U.S. National Stage Application of International Application No. PCT/US2017/024203, filed on Mar. 26, 2017, which claims the benefit of U.S. Provisional Patent Application No. 62/411,717, for "Time-Reversed Nonlinear Acoustic Downhole Pore Pressure Measurements" by Harvey E. Goodman et al., which was filed on 24 Oct. 2016, the entire contents of which Patent Application is hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

BACKGROUND OF THE INVENTION

Pore pressures are the fluid pressures in the pore spaces in porous formations. Knowledge of pore pressure in a formation is valuable for planning drilling operations and for geochemical and geological analyses. The pore pressure gradient is used in drilling for determining mud weight, which is selected based on pore pressure gradient, wellbore stability and fracture gradient prior to setting and cementing a casing. Drilling fluid is then applied in the form of mud pressure to support the wellbore walls for preventing influx and wellbore collapse during drilling. Geological analyses include initial reserve estimation and fluid contact identification.

Presently, formation pore pressure characterization is achieved through direct formation probe contact either in an open hole or through flow testing from perforations after the wellbore has been cased and cemented. Pore pressure may also be measured directly by well production testing with open hole packer isolation.

Investigation of elastic nonlinearity of materials has broad applications, including medical imaging, civil engineering, and geophysics, since elastic nonlinearity is a sensitive measurement of mechanical damage in solids.

SUMMARY OF THE INVENTION

To achieve the purposes of the embodiments of the present invention, as embodied and broadly described herein, the method for determining pore pressure in a formation through a borehole having a metal casing, hereof includes: generating low frequency, sinusoidal acoustic signal, having a chosen frequency and amplitude focused in a volume surrounding the borehole and effective for generating strain in the volume; transmitting pulsed, high frequency acoustic signals through the volume; measuring signals generated in the formation in the volume relating to particle velocity or particle acceleration in the formation from which the generated strain is determined; and measuring time-of-flight of the pulsed, high frequency acoustic signals through the volume for a known strain; whereby the change of the time-of-flight of the pulsed, high frequency acoustic signals as a function of the generated strain is determined, from which the pore pressure is determined.

In another aspect of the embodiments of the present invention for achieving the purposes thereof, as embodied and broadly described herein the apparatus for measuring pore pressure in a formation through a borehole having a metal casing, hereof includes: a transceiver trained to focus time-reversed acoustic signals in a focal volume centered on the borehole; a probe source comprising a transmitting transducer for transmitting high frequency acoustic pulses into the focal volume; a receiver comprising a receiving transducer for receiving the high frequency acoustic pulses transmitted by the probe source, from the focal volume; a signal processor for measuring the time-of-flight of the received high frequency acoustic pulses; and a sensor disposed in contact with the metal casing for measuring particle velocity or particle acceleration from which the strain in the volume is determined.

Benefits and advantages of embodiments of the present invention include, but are not limited to, providing an apparatus and method for measuring pore pressure in a rock formation in cased and open hole environments without direct contact with the formation.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1A:
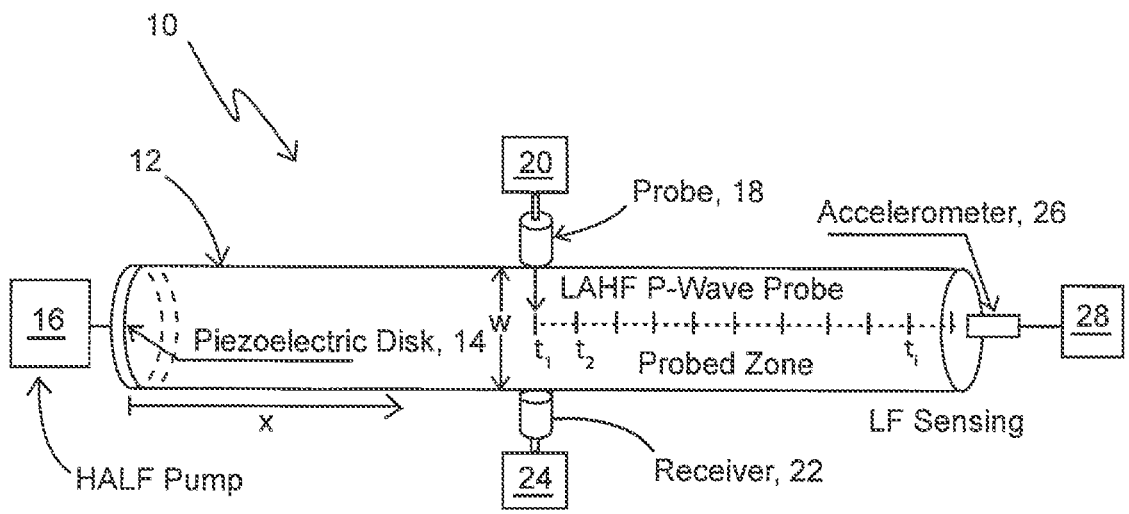
FIG. 1A is a schematic representation of a laboratory apparatus for Dynamic Acoustic Elasticity measurements in a cylindrical sandstone bar.

Briefly, the present invention includes the measurement of formation pore pressure either through a pipe after a well is cased and cemented, or in an open hole, thereby eliminating direct contact with the formation. This may be accomplished by using the Dynamic Acoustic Elasticity (DAE) method for characterizing nonlinear parameters by perturbing a selected rock formation region with a High Amplitude, Low Frequency (HALF) acoustic strain wave, and probing this region with a Low Amplitude, High Frequency (LAHF) acoustic wave. Accurate values for the pore pressure in a formation are valuable for the prediction of gas/water contacts, which permit more accurate location of hydrocarbons in the formation.

The change in wave speed as the HALF induced strain field oscillation propagates through the formation is linked to the nonlinear elastic parameters $\alpha$, $\beta$, $\delta$, and A of the pore pressure. The modulation of the time of flight of LAHF probe pulses by the imposed acoustic (HALF or pump) changes in the formation strain are measured. The perturbations in the formation caused by the pump are sufficiently long to permit many probe pulses to be sent at different times in the pump cycle, typically hundreds or thousands of probe pulses for a 0.5 s to 1 s pump pulse. Effective probe pulses are sufficiently short to be resolvable without interfering with each other so that the relative timing of the arrival of the pulses can readily be measured.

Frequency mixing and resonance-based nonlinear ultrasonic measurements, where ultrasonic or acoustic waves propagate through a statically stressed specimen, permit extraction of average variations of modulus and attenuation versus strain level (generally only compressive), but by contrast require static strain levels $>10^{-4}$ to be properly measured.

The following is a short description of DAE measurements which generate "butterfly" shapes from which the parameters $\alpha$, $\beta$, $\delta$, and A may be determined.

In a DAE measurement a "pump" strain field, characterized by the amplitude of the pump strain $A_{pump}$, is established in the sample. At $t_i$ the pump strain in the sample is given by $$\varepsilon_{pump}(t_i) = A_{pump} \sin(\omega_{pump} t_i) \quad (1)$$

The elastic state of the sample at $t_i$ is inspected with a low amplitude "probe" pulse that crosses the strain field of the sample at time $t_i$. In crossing the sample at $t_i$ the probe pulse senses the sample experiencing strain field $\varepsilon_{pump}(t_i)$. The time for the probe pulse to cross the sample at $t_i$ is $t_{cross}(\varepsilon_{pump}(t_i))$. The quantity of interest is the change in crossing time brought about by the pump strain, that is, $$\Delta t_i = t_{cross}(\varepsilon_{pump}(t_i)) - t_{cross}(0) = \omega/c_i - \omega/c_0 \approx (\omega/c_0) \cdot \Delta c_i/c_0 \quad (2)$$

or $$\Delta c_i/c_0 = -\Delta t_i/t_0, t_0 = \omega/c_0, \quad (3)$$

where $\omega$ is the length of the path the probe pulse traverses, $c_i = c(\varepsilon_{pump}(t_i))$, and $c_0 = c(\varepsilon_{pump} = 0)$. The probe pulse is directed across the sample at all possible phases of the pump strain. The change in crossing time or the change in c is measured as a function of the pump strain at the time of crossing, $\Delta c/c_0$ vs $\varepsilon_{pump}$.

Data includes $\Delta c/c_0$ (plotted on the y-axis) as a function of the pump strain field ($\varepsilon_p$) (plotted on the x-axis). The pump strain is of order 5µ-strain, and the velocity shifts are negative and of order $2 \times 10^{-3}$. The velocity shift has a negative DC value of order $10^{-3}$. The shift in velocity is to be represented as a function of the pump strain (denoted here as $\varepsilon_p$) in the form:

$$\Delta c(\varepsilon_p)/c_0 = \frac{1}{2}[\alpha A_p + \beta(\varepsilon_p) + \delta(\varepsilon_p)^2 + A(\varepsilon_p)], \quad (4)$$

where $\alpha A_P$ is the intercept that depends on the amplitude the pump strain, $A_P$, $\beta$ is the coefficient of $(\varepsilon_p)$, $\delta$ is the coefficient of $(\varepsilon_p)^2$, and $A(\varepsilon_p)$ represents a function related to the hysteric component of $\Delta c/c_0$. $\alpha A_P$ is the intercept that depends, not on the instantaneous pump strain, but on the amplitude of the pump strain, $A_P$ (See, Eq. (1) hereof). $\alpha A_P$ is found as the average of all of the measured values of $\Delta c/c_0$. For the measured data set, $\alpha A_P \approx -1.1 \times 10^{-3}$.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1A, a laboratory apparatus, 10, for DAE measurements is illustrated. Cylindrical bar, 12, of Berea sandstone having a length of 305.5 mm, a diameter, $\omega$ of 25.8 mm, a density of 2054 kg/m$^3$ and an unperturbed sound speed, $c_0$ of 1916 m/s, was suspended from strings or wires to simulate free boundary conditions. Piezoelectric disk, 14, driven by High Amplitude, Low Frequency (HALF) acoustic source, 16, generates compression waves in bar 12, which are interrogated by transmitting piezoelectric probe transducer, 18, driven by Low Amplitude, High Frequency (LAHF) acoustic source, 20 and receiving transducer, 22, having associated receiving electronics, 24. Non-contact vibrometer, 26, having controlling and receiving electronics, 28, measures low frequency movement of bar 12 at the far end thereof from HALF pump 14. A laser vibrometer was employed. A contact piezoelectric transducer-based accelerometer may also be used. $t_{cross}(t_i) = \omega/c(\varepsilon_{pump}(t_i))$, the time it takes an acoustic pulse from probe transducer 18 to cross the diameter $\omega$ of bar 12 at various locations, $t_i$ along the length thereof, is measured as a function of the strain generated in bar 12 by HALF acoustic pump 16, as LAHF source 20 and receiving transducer 22 are moved to various positions $t_i$ along bar 12. Typically, ~3 kHz (i.e., the fundamental resonance) was used for the pump for bench top studies (50 Hz to 10 kHz as a range). For formation studies 1-5 kHz may be used in order to achieve appropriate penetration (~1 m wavelength). In general $10^{-5}$ to $10^{-4}$ strain amplitude is achieved with the pump, but the actual applied pump power varies with the source. Probe frequency was approximately 500 kHz (100 kHz to 1 MHz as a range).

Figure 1B:
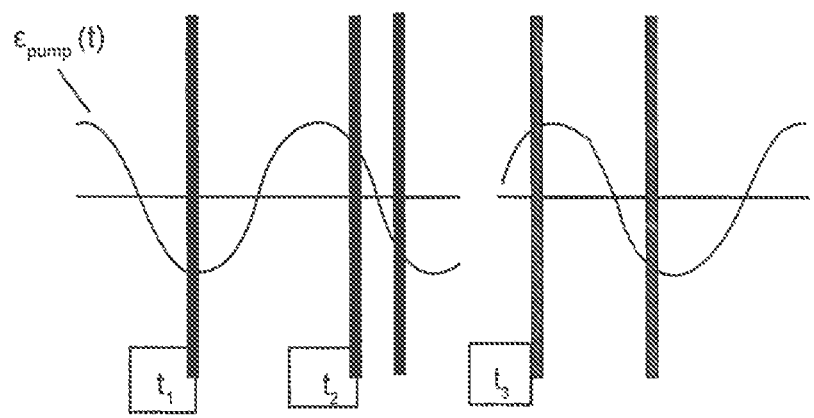
FIG. 1B shows various phases of the pump strain applied to the bar.
Figure 1C:
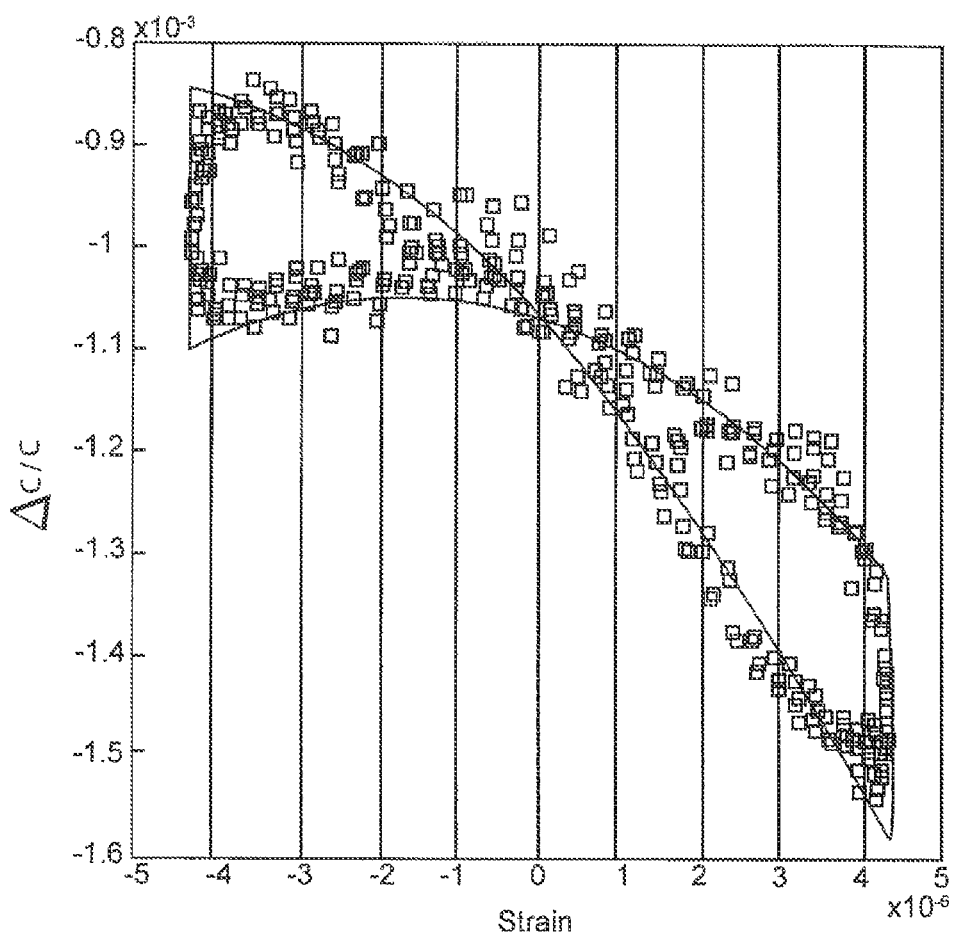
FIG. 1C is a graph of $\Delta c(\varepsilon_p)/c_0$ as a function of strain, $\varepsilon_p$, generated by a piezoelectric transducer having the waveform shown in FIG. 1B.

FIG. 1B illustrates various phases of the pump strain in bar 12, and FIG. 1C is a graph of $\Delta c(\varepsilon_p)/c_0$ as a function of strain, $\varepsilon_p$, generated by pump 16 in bar 12. Strain levels may be between $10^{-8}$ and $10^{-5}$ for such measurements, and the sample is interrogated under both compression and tension, thereby allowing elastic response over a complete dynamic stress cycle to be obtained.

Figure 2:
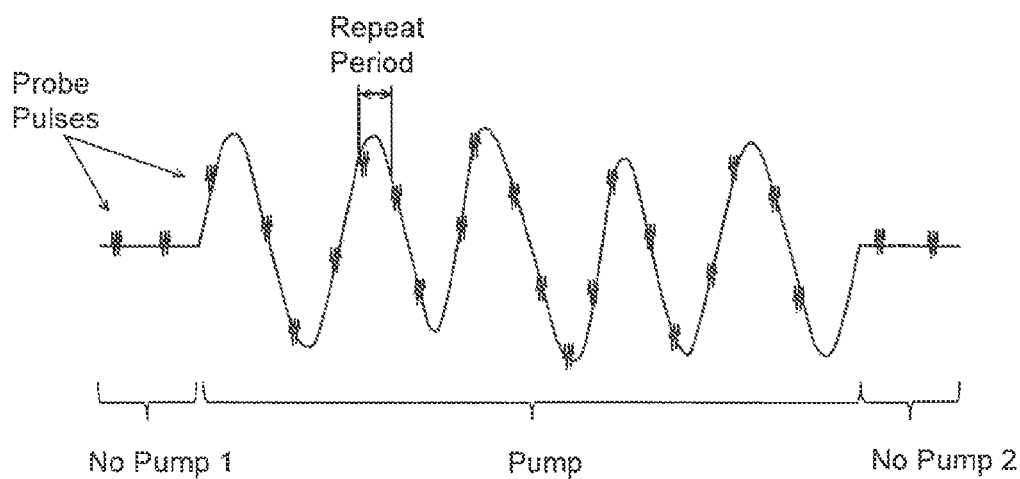
FIG. 2 is an illustration of the pump/probe method of the present invention, showing a periodic pump signal being applied to a formation, which is then probed using a pulsed probe signal.
Figures 3A, 3B:
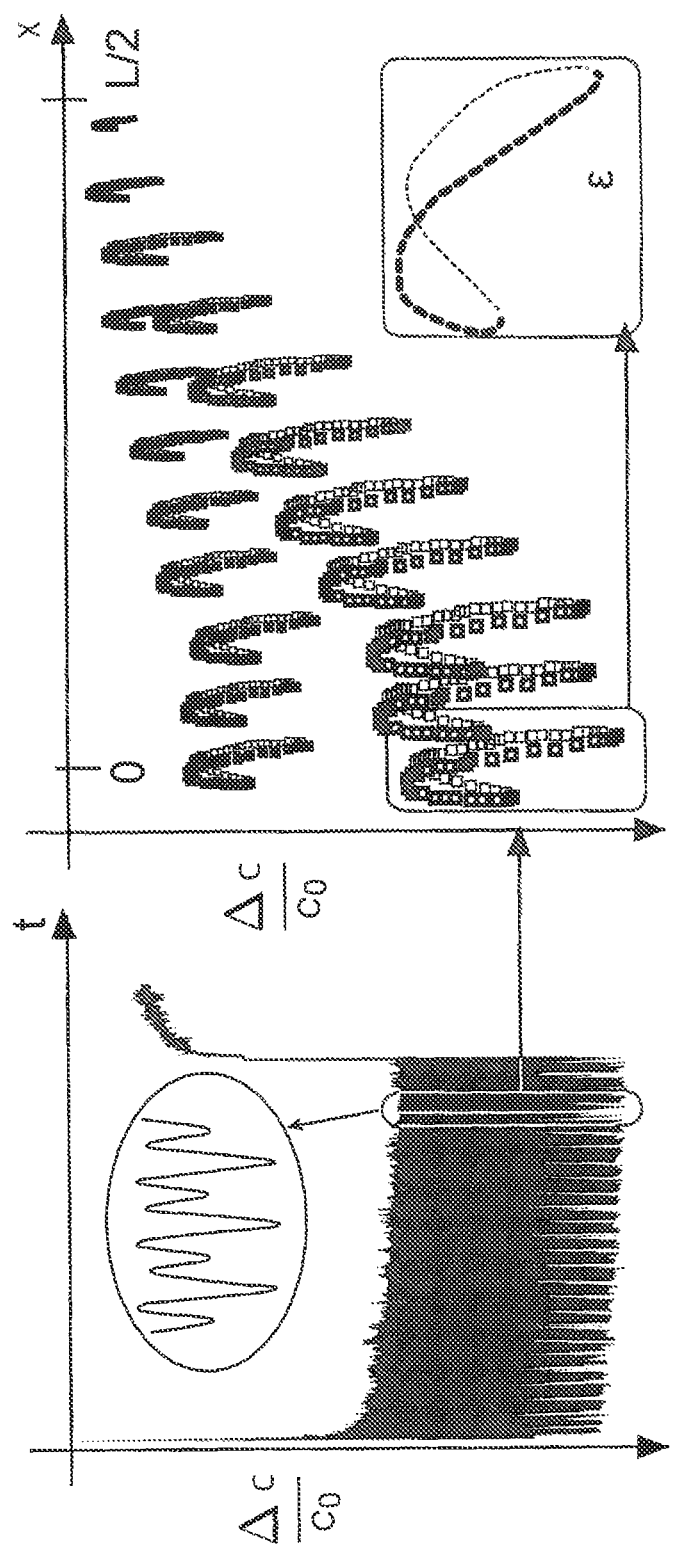
FIG. 3A is a graph of $\Delta c(\varepsilon_p)/c_0$ as a function of time.
FIG. 3B is a graph of $\Delta c(\varepsilon_p)/c_0$ as a function of strain in a cylindrical sandstone bar as measured from the center of the bar to the free end thereof at 11 positions and for 4 different amplitudes of the applied pump transducer.
Figure 4:
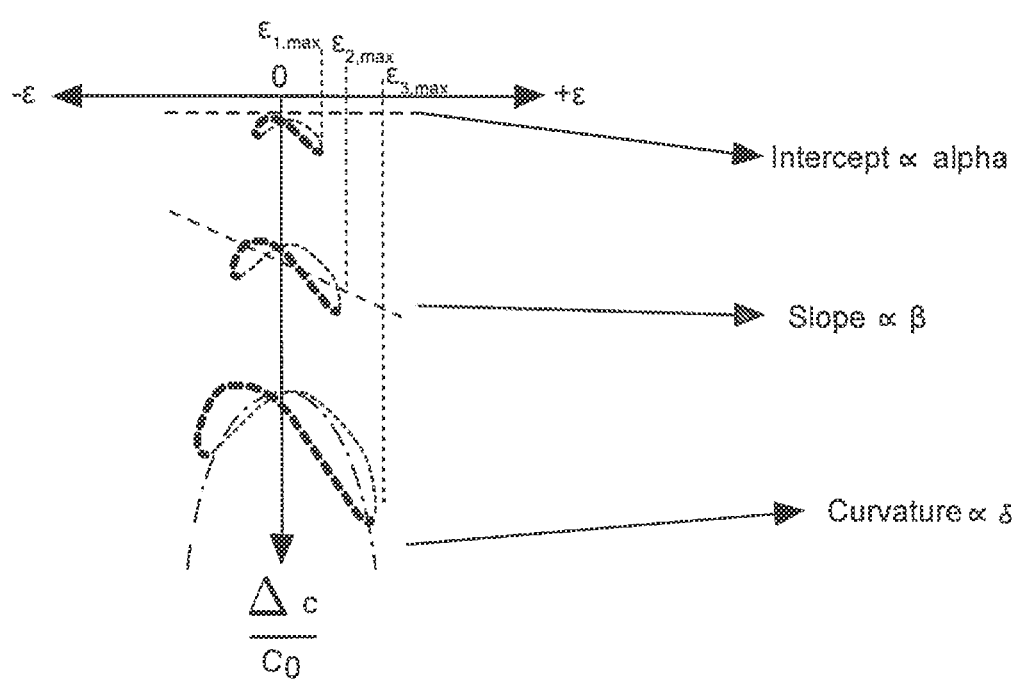
FIG. 4 illustrates the relationship between the parameters $\alpha$, $\beta$, and $\delta$ of the pore pressure, and the characteristics of the generated "butterfly" curves ($\Delta c(\varepsilon_p)/c_0$ as a function of strain, $\varepsilon_p$).

The nonlinear elastic parameters in Eq. 4 above depend on the change in acoustic wave speed as a function of formation strain. This change in wave speed as a function of strain is fit to a quadratic polynomial with the coefficients used to extract $\alpha$, $\beta$, and $\delta$. The details of the data analysis may be found in a paper by J. Riviere et al., Journal of Applied Physics 114, 054905 (2013). The area of the loops (hysteresis) as a function of strain, $\varepsilon_p$(max), can also be used, and is proportional to $\alpha$. FIG. 2 is an illustration of the pump/probe method of the present invention, while FIG. 3A is a graph of $\Delta c(\varepsilon_p)/c_0$ as a function of time, whereas FIG. 3B is a graph of $\Delta c(\varepsilon_p)/c_0$ as a function of strain in the cylindrical sandstone bar. Measurements are made from the center of the bar to the free end thereof at 11 positions and for 4 different amplitudes of the applied pump transducer. FIG. 4 illustrates the relationship between the parameters $\alpha$, $\beta$, and $\delta$ and the characteristics of the generated "butterfly" curves ($\Delta c(\varepsilon_p)/c_0$ as a function of strain, $\varepsilon_p$).

Figure 5:
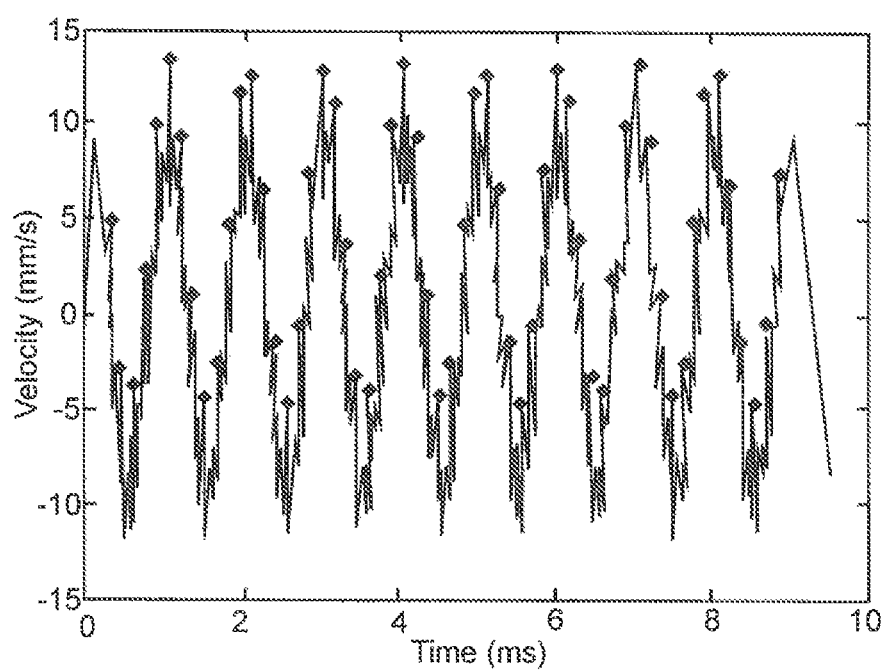
FIG. 5 is a graph of the particle velocity measured by a non-contact accelerometer at the free end of the sandstone bar, as a function of time.

FIG. 5 is a graph of the particle velocity measured by the non-contact accelerometer 26 (FIG. 1), as a function of time.

Pore pressure in a formation as a function of confining pressure and nonlinear elastic parameters of the material is given by $$P = \frac{1}{b}(\sigma - K[1 - \beta\varepsilon - \delta\varepsilon^2]\varepsilon + K\frac{\alpha}{2}[((\Delta\varepsilon)^2 - \varepsilon^2)\text{sign}(\dot{\varepsilon}) - 2(\Delta\varepsilon)\varepsilon]), \quad (5)$$

where b is the Biot Coefficient (typically 0.4-0.9 in rock), K is the linear stiffness constant, $\varepsilon$ is the strain, $\Delta\varepsilon$ is the strain amplitude, $\dot{\varepsilon}$ denotes the partial derivative with respect to time, sign is a function returning the sign (positive or negative) of the argument, $\beta$ and $\delta$ are combinations of third- and fourth-order elastic constants representing the acoustoelasticity (quadratic and cubic classical nonlinearity), and the parameter $\alpha$ relates to the strength of the hysteresis, according to the Preisach-Mayergoyz model of elasticity. See, e.g., K. R. McCall et al., "A new theoretical paradigm to describe hysteresis, discrete memory and nonlinear elastic wave propagation in rock," *Nonlin. Proc. Geophys.* 3, 89-101 (1996), R. A. Guyer et al., "Quantitative implementation of Preisach-Mayergoyz space to find static and dynamic elastic moduli in rock," *J. Geophys. Res.* 102(B3), 5281-5293 (1997), and G. Douglas Meegan, Jr. et al., "Observations Of Nonlinear Elastic Wave Behavior In Sandstone," J. Acoust. Soc. Am. 94, (1993) 3387-3391.

As described above, the parameters $\alpha$, $\beta$, and $\delta$ may be obtained from plots of $(\Delta c(\varepsilon_p)/c_0$ as a function of strain, $\varepsilon_p$. In what follows, $\Delta c(\varepsilon_p)/c_0$ will be replaced by $\Delta C/C_0$, and $\varepsilon_p$ will be replaced by $\varepsilon$. $\alpha$ is given by:

$$\alpha = \frac{\Delta C}{C_0}\frac{1}{\varepsilon} \quad (6)$$

$$\varepsilon = \frac{\ddot{u}}{2\pi f C_0},$$

where $C_0$ is the linear velocity and C the perturbed velocity. The second derivative of u with respect to t is the particle acceleration that is frequently measured, f is the wave fundamental frequency, and $\varepsilon$ is the strain measured at frequency f in the focal region as the signal source amplitude is increase. Alternatively, alpha can be obtained from the third harmonic amplitude also when wave amplitudes are large. In the following alpha, beta and delta are shown.

$$\alpha = \frac{c_0^2}{L}\frac{\ddot{u}_{3f}}{\ddot{u}_{1f}^2} \quad (7)$$

-continued $$\beta = \frac{c_0^2}{L}\frac{\ddot{u}_{2f}}{\ddot{u}_{1f}^2}$$

$$\delta = \frac{\omega c_0^3}{L}\frac{\ddot{u}_{3f}}{\ddot{u}_{1f}^3}$$

where L is the wavelength of the fundamental frequency divided by two, equivalent to the radius of the focal region, the second derivative of u with respect to time, 3f, is the third harmonic acceleration amplitude, the second derivative of u with respect to time, 2f, is the second harmonic acceleration amplitude, the second derivative of u with respect to time, 1f, is the fundamental harmonic acceleration amplitude, and $\omega = 2\pi f$, where f is the fundamental frequency.

Time reversal is a method for focusing acoustic waves such that intense (non-damaging) sound amplitudes are generated in a volume to induce local nonlinearities. As an example, waves may be introduced into a borehole using a piezoelectric transceiver. The waves are recorded on another transceiver located elsewhere in the borehole. The recorded waves are then reversed in time, and emitted from the detecting transceivers, where they follow their forward wave paths backwards-in-space, and coalesce, focusing at the original source transceiver, since the elastic wave equation is symmetric with respect to time. That is, the wave equation may be evaluated either forward or backward in time, the physics being identical. Amplitudes at the time-reversed focus are large due to conservation of energy, since all of the energy contained in the long-duration scattered-signal is collapsed onto the focal point in space and time. Since wave amplitudes are largest at the focus, the local response may be nonlinear, but only at the focus.

Figure 6:
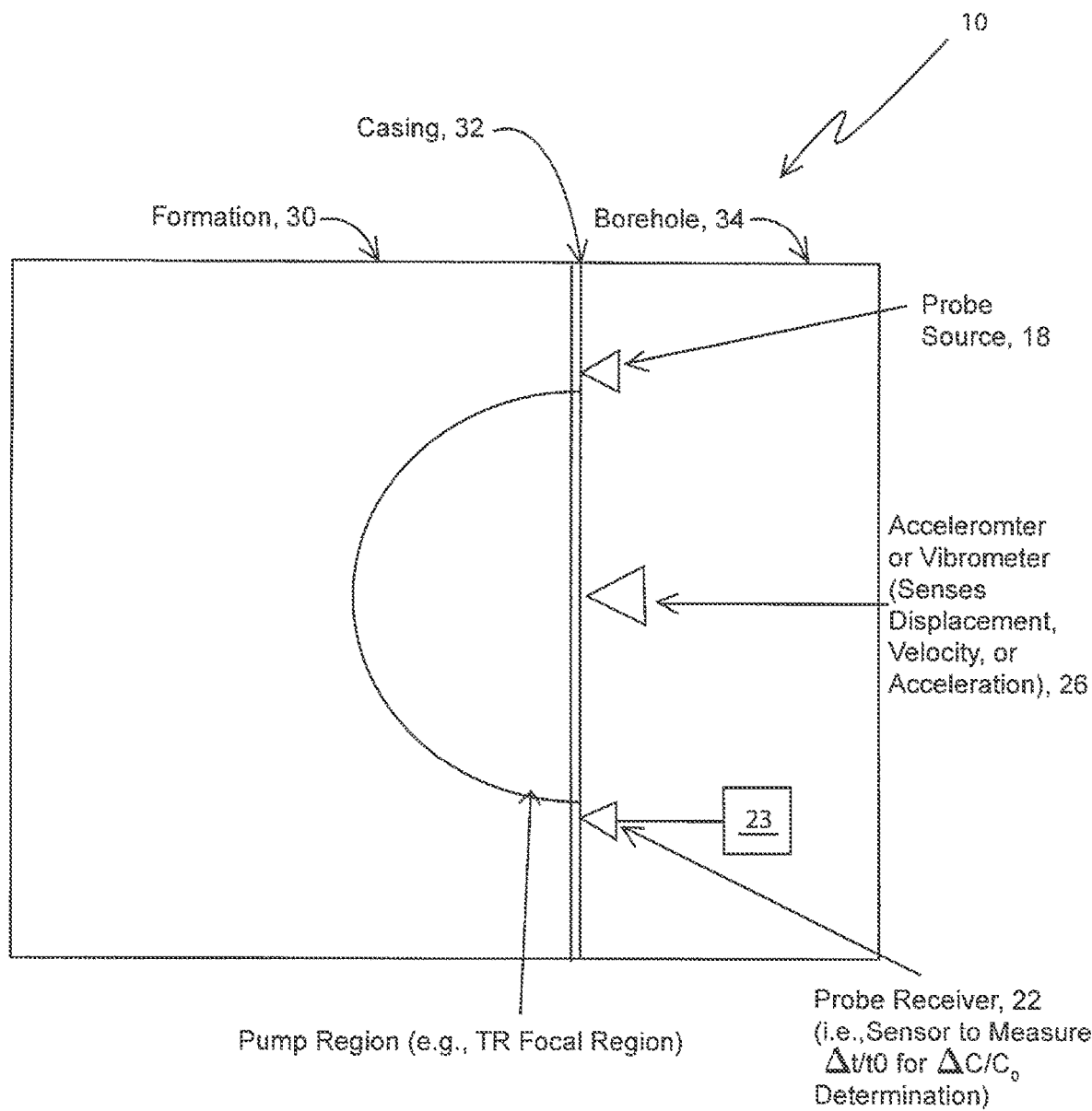
FIG. 6 is a schematic representation of an embodiment of the present apparatus for measuring downhole pore pressure based on Dynamic Acoustic Elasticity.

FIG. 6 is a schematic representation of an embodiment of the present apparatus, 10, for measuring downhole pore pressure based on DAE. As will be described in FIG. 7, below, TR NEWS (Time Reversal Nonlinear Elastic Wave Spectroscopy) or a phased array may be used to generate the strain in formation 30. LAHF formation probe source, 18, which generates pulses having sinusoidal frequencies between 200 kHz and 1.5 MHz, and LAHF detector 22, which together determine the delay in the velocity of generated LAHF pulses resulting from the strain generated in the formation, using signal processor, 23, are placed in contact with casing, 32, surrounding borehole, 34. Steel casings are typically used for this purpose, and do not significantly distort acoustic signals generated in the formation. At 50 cm to 1 m acoustic wavelengths, attenuation by a 0.25" steel casing, is small, but can be corrected for, since steel is not attenuative when compared to rock. Non-contact vibrometer, 26, (or contact accelerometer) which is a calibrated sensor for determining the displacement, velocity or acceleration, respectively, of the particles in the formation as a result of the generated strain, is also placed in casing, 32, surrounding borehole, 34. Measurements of $\Delta C/C_0$ as a function of $\varepsilon$ can be made, from which the pore pressure can be determined. For bench top experiments laser vibrometers, which are non-contact, were employed. Accelerometers are piezoelectric-based sensors and therefore are contact sensors. Piezoelectric contact transducers as well as an LVDT (linear variable differential transformer) which is a displacement sensor, were used for measurements of the pump amplitude in the laboratory.

When a laser vibrometer is used in the Doppler mode, particle velocity is directly measured, while in the interferometer mode, particle displacement is directly measured.

When an accelerometer is used, the particle acceleration is directly measured. The pump strain ε is determined by dividing the measured dynamic particle velocity (v) by the wave speed (c) in the formation, that is, ε=v/c. the pump signal particle velocities at the sensor are oscillatory, the strain is also oscillatory. Thus, a strain waveform is obtained as a function of time. The times at which the probe pulses are generated are determined such that the strain is known at these times. Those strains are the values plotted on the x-axes, in the FIGURES described above.

Focusing occurs in the rock formation, even though generated within the casing of the borehole. The volume of the focus is determined by the frequency of the time reversed signal. Further, since the TR waves propagate and collapse through the propagation medium, onto the point of focus, the sensors detect the properties, nonlinear and otherwise, of the waves.

The probe signal is applied at a constant time spacing. The time it takes for the probe pulse to travel to the probe detector can be directly measured by knowing the timing and spacing of the probe emitter/detector pair. As the pump disturbs the formation, the probe signal may be advanced or retarded in time. This can be extracted by continually measuring the probe. Distances and materials do not change during the measurement, so a change in time can be directly related to a change in velocity. $\Delta C/C_0$ is measured from the timing relative to a reference signal as the probe pulse travels through the radius of the TR focus. Strain ε is measured by the particle velocity divided by the wave speed. Particle velocity is directly measured by the calibrated sensor at the focal point. Alternatively, the sensor measures particle acceleration and a correction made to generate the particle velocity. Note that the vibrometer measurements are non-contact, while accelerator measurements are contact measurements.

Figure 7:
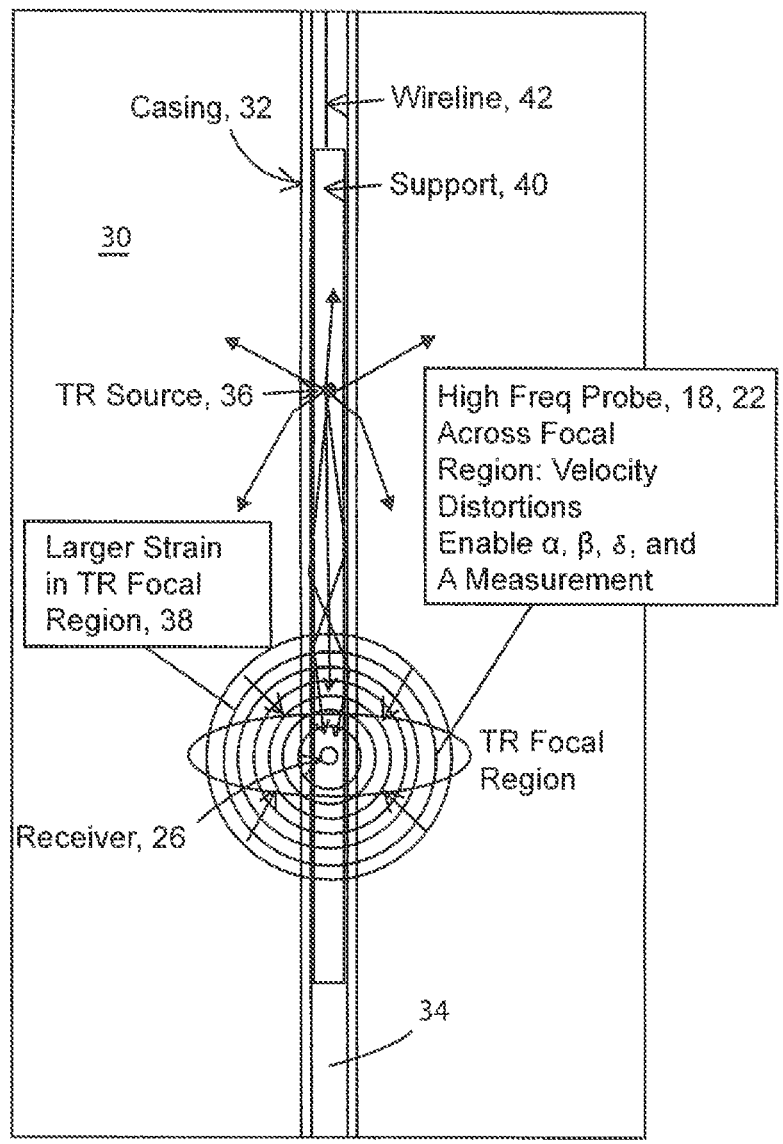
FIG. 7 is a schematic representation of an embodiment of the present apparatus for measuring downhole pore pressured based on Dynamic Acoustic Elasticity, where the strain in the formation is generated using Time Reversal Nonlinear Elastic Wave Spectroscopy.

FIG. 7 is a schematic representation of an embodiment of the present apparatus for measuring downhole pore pressured based on Dynamic Acoustic Elasticity, where the strain in the formation is generated using Time Reversal Nonlinear Elastic Wave Spectroscopy. As stated above, phased arrays of acoustic sources may also be utilized. For a phased array, waves are directed into a focal region, which is difficult in a rock formation because of scattering, whereas for time reversal, the response due to the scattering is measured directly and used to focus the energy. Scattering by the formation and casing is built into the time reversal process, and is automatically accounted for.

In accordance with the time-reversal process, acoustic signals from source, 36, are trained to focus into focal region, 38. Only one source is shown, but many sources may be used to increase the signal intensity, thereby increasing the strain applied to the formation. The phase relationships among the waves permit the constructive interference thereof resulting in space and time focusing effective for inducing a nonlinear strain in the formation 30 focal volume 38. As briefly mentioned above, if the sound velocity in formation 30 is known (as is generally the situation) using the relationship for the wavelength, λ=velocity/frequency, the diameter of the focal spot measured at the half maximum value is equal to one-half of the dominant wavelength. See, e.g., "Depth Profile Of A Time-Reversal Focus In An Elastic Solid," by Marcel C. Remillieux et al., Ultrasonics 58 (2015) 60-66. Time Reversal Source support, 40, is adapted to fit in borehole 34 having an inner diameter of 6 in., as an example, and may be constructed of sturdy plastics capable of withstanding high temperatures and caustic environments.

In operation, the tool of FIG. 7 may be employed as follows:
1. Lower the tool into a cased borehole;
2. Focus a chosen amplitude and frequency of ultrasonic energy through the borehole casing using time reversal or phased arrays as the HALF;
3. Record the time delay of the probe signal pulses, LAHF, focused in the same region as the HALF, as a function of the strain ε in the formation measured at the receiver in the bore hole;
4. Vary the source amplitude and frequency, and repeat measurements at the receiver;
5. Measure $\Delta C/C_0$ at the various source amplitudes and frequencies to determine α, β, and δ; and
6. Determine the pore pressure in the HALF region.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining pore pressure in a formation through a borehole having a metal casing, comprising:
generating strain in a subsurface volume surrounding the borehole by focusing a low frequency, periodic acoustic signal on the subsurface volume, the low frequency, periodic acoustic signal having a first amplitude at a first time and a second amplitude at a second time, wherein the first amplitude of the low frequency, periodic acoustic signal generates first strain in the subsurface volume and the second amplitude of the low frequency, periodic acoustic signal generates second strain in the subsurface volume;
transmitting pulsed, high frequency acoustic signals through the subsurface volume simultaneously with the generation of strain in the subsurface volume with the low frequency, periodic acoustic signal;
measuring signals generated in the formation in the subsurface volume relating to particle velocity or particle acceleration in the formation;
determining the strain in the subsurface volume from the signals generated in the formation in the subsurface volume relating to the particle velocity or the particle acceleration in the formation, wherein the strain determined in the volume includes the first strain corresponding to the first amplitude of the low frequency, periodic acoustic signal and the second strain corresponding to the second amplitude of the low frequency, periodic acoustic signal;
measuring time-of-flight of the pulsed, high frequency acoustic signals through the subsurface volume as a function of strain within the subsurface volume during the generation of strain in the subsurface volume with the low frequency, periodic acoustic signal, the time-of-flight of the pulsed, high frequency acoustic signals including a first time-of-flight corresponding to the first strain and a second time-of-flight corresponding to the second strain;
determining change of the time-of-flight of the pulsed, high frequency acoustic signals as the function of the strain within the subsurface volume, the change of the time-of-flight of the pulsed, high frequency acoustic signals as the function of the strain within the subsurface volume including change from the first time-of-flight corresponding to the first strain to the second time-of-flight corresponding to the second strain;

determining nonlinear elastic parameters α, β, and δ based on the change of the time-of-flight of the pulsed, high frequency acoustic signals as the function of the strain within the subsurface volume, wherein determination of the nonlinear elastic parameters α, β, and δ includes determination of the nonlinear elastic parameter α based on an inverse of the particle acceleration and a ratio of change in perturbed velocity to linear velocity; and determining pore pressure in the subsurface volume based on the nonlinear elastic parameters α, β, and δ.

2. The method of claim 1, wherein the low frequency, periodic acoustic signal is focused using time reversal.

3. The method of claim 1, wherein the pulsed, high frequency acoustic signals are generated in the borehole.

4. The method of claim 1, wherein the low frequency, periodic acoustic signal is focused in the borehole.

5. The method of claim 1, wherein the particle velocity or the particle acceleration is measured from vibrational signals on the metal casing.

6. The method of claim 1, wherein the low frequency periodic acoustic signal is between 1 Hz and 1000 Hz.

7. The method of claim 1, wherein the pulsed, high frequency acoustic signals have a frequency between 200 kHz and 1.5 MHz.

8. An apparatus configured to determine pore pressure in a formation through a borehole having a metal casing, comprising:

a transceiver trained to focus time-reversed acoustic signals in a focal volume centered on said borehole and generate strain in the focal volume, wherein a first strain is generated in the focal volume at a first time and a second strain is generated in the focal volume at a second time;

a probe source comprising a transmitting transducer configured to transmit high frequency acoustic pulses into the focal volume while the transceiver focuses the time-reversed acoustic signals in the focal volume;

a receiver comprising a receiving transducer configured to receive, from the focal volume, the high frequency acoustic pulses transmitted by the probe source;

a signal processor configured to determine time-of-flight of the received high frequency acoustic pulses; and a sensor disposed in contact with the metal casing configured to generate signals conveying particle velocity or particle acceleration wherein:

the strain in the focal volume is determined based on the signals conveying the particle velocity or the particle acceleration, wherein the strain determined in the focal volume includes the first strain at the first time and the second strain at the second time;

the time-of-flight of the received high frequency acoustic pulses include a first time-of-flight corresponding to the first strain and a second time-of-flight corresponding to the second strain;

change of the time-of-flight of the received high frequency acoustic pulses as the function of the strain in the focal volume is determined, the change of the time-of-flight of the received high frequency acoustic pulses as the function of the strain in the focal volume including change from the first time-of-flight corresponding to the first strain to the second time-of-flight corresponding to the second strain;

nonlinear elastic parameters α, β, and δ are determined based on the change of the time-of-flight of the received high frequency acoustic pulses as the function of the strain in the focal volume, wherein determination of the nonlinear elastic parameters α, β, and δ includes determination of the nonlinear elastic parameter α based on an inverse of the particle acceleration and a ratio of change in perturbed velocity to linear velocity; and pore pressure in the focal volume is determined based on the nonlinear elastic parameters α, β, and δ.

9. The apparatus of claim 8, wherein said transmitting transducer is placed in contact with the metal casing of the borehole.

10. The apparatus of claim 8, wherein said receiving transducer is placed in contact with the metal casing of the borehole.

11. The apparatus of claim 8, wherein the time-reversed acoustic signals are between 1 Hz and 1000 Hz.

12. The apparatus of claim 8, wherein the high frequency acoustic pulses have a frequency between 200 kHz and 1.5 MHz.

* * * * *